Dec. 26, 1967 D. A. LINDSAY 3,360,018

LEAD WIRE SHAPING TOOL

Filed July 29, 1965

INVENTOR:
DAVID AUGUST LINDSAY

BY Kenyon & Kenyon

ATTORNEYS

United States Patent Office 3,360,018
Patented Dec. 26, 1967

3,360,018
LEAD WIRE SHAPING TOOL

David A. Lindsay, Brookfield, Conn., assignor to Data-Control Systems, Inc., Danbury, Conn., a corporation of Delaware Filed July 29, 1965, Ser. No. 475,659
7 Claims. (Cl. 140—106)

ABSTRACT OF THE DISCLOSURE

A tool, for shaping lead-in wires of electrical components, has plier jaws with mating slots on the jaws' gripping surfaces for holding a portion of the body of the component. The jaws also grip a portion of the lead-in wire which extends from the closed jaws and rests on an L-shaped bracket, fastened to the outer surface of one jaw. A lever, mounted on the tool, pivots into the space between the closed jaws and the bracket, bending the wire and shaping it to conform to the contours of the outer surfaces of the jaws, the inner wall of the bracket, and the pivoting lever.

This invention relates to tools used for shaping wires and more particularly to a tool used to shape the wire connecting elements extending from a solid body electrical component.

In the connection of the wire leads of electronic components such as resistors, capacitors or diodes to the openings or eyelets in printed circuits or other similar installations, it is oftentimes necessary to place a bend in the wire lead secured to the component after the component has been manufactured. This bend, the length and shape of which varies depending upon the installation, enables the lead wires of the component to be passed through the openings so that the component can be installed on one side of a printed circuit while the electrical connections can be made on the other side. Further with the particular bend of this invention the wide connector is smoothly shaped and any abrupt changes are avoided. In this manner the lead wires can be bent and the components can be securely connected to the circuit board in a uniform manner without damage to the component during the bending and connecting.

Of critical importance in the shaping of the bend described above is that the body of the component itself be kept free from injury. To assure this, it has been found desirable to keep the component isolated from the bending forces applied to the wires. Further requirements of a tool designed to perform such a bending operation are that it be portable, easy to use and capable of accommodating various types and sizes of electrical components.

An object of this invention is to provide a portable, easy to use tool for bending wire leads.

Another object of this invention is to provide a tool for shaping the electrical leads without injuring the component itself.

A further object is to provide a tool capable of handling various sizes of electrical components.

Briefly, the invention comprises a pair of plier-like jaws which rigidly hold the wire leads while the electrical component is loosely positioned in indentations placed in the jaws to receive the component. A pivoted element, secured to the side of the tool, acts to bend the connecting wire by forcing the portion of the wire not held within the jaws of the tool between the side of the jaws and an L-shaped wire support fastened to the bottom of one of the jaws. In this manner the wire is bent in the desired shape while the component is isolated from and unaffected by the forces causing the bending.

Figures 1, 2, 3, 4, 5, 6, 7:
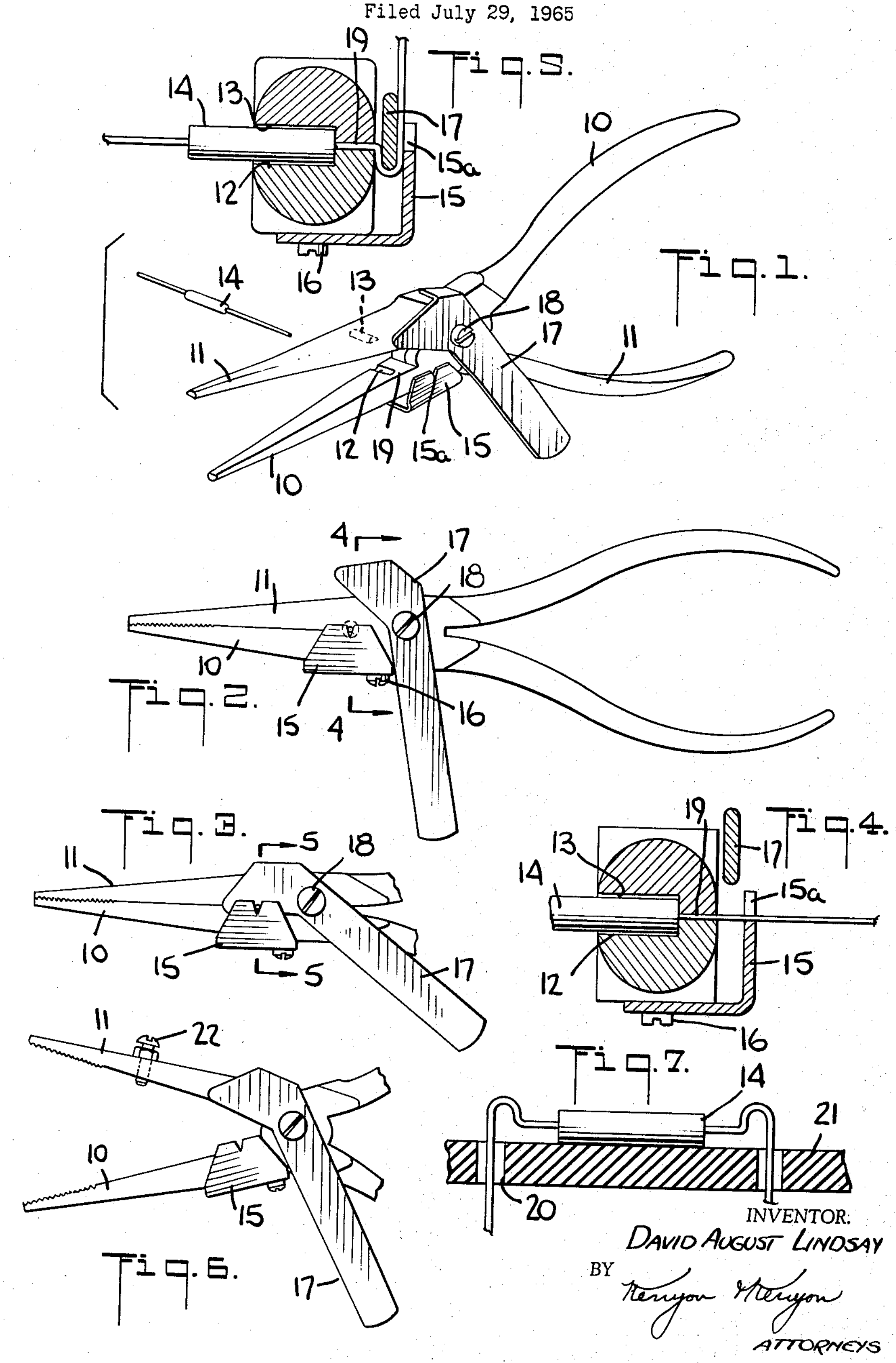
FIG. 1 is a perspective view of the tool showing the indented plier-like jaws and an electrical component adjacent thereto having lead wires which can be formed by means of the tool.
FIG. 2 is a side view of the tool showing the L-shaped wire support member, the plier-like jaws, and the bending element in its upward position.
FIG. 3 is a partial side view of the device showing the bending element in its operative position forcing the wire between the side of the jaws and the L-shaped wire support.
FIG. 4 is a cross-sectional view taken on lines 4—4 of FIG. 2, showing the relationship of the bending element in its inoperative position to the other members of the tool.
FIG. 5 is a vertical section view taken along lines 5—5 of FIG. 3 and showing the bending element in its operative position intersecting and shaping the wire connective element.
FIG. 6 is a side view illustrating the adjustment screw attached to one of the jaws of the invention in order to enable the tool to accommodate various sizes and types of components.
FIG. 7 is a vertical section view of an electrical circuit board and illustrates a typical installation of an electrical component, the wire leads of which have been shaped by the invention.

Referring to the drawings for a more detailed description of the present invention, 10 and 11 in FIG. 1 represent the holding means or the pivotal plier-like jaws. In the pivotal jaws, indentations 12 and 13 are provided for receiving the electrical component 14 during the shaping of the wire connector. The indentations are made sufficiently large so that various types and sizes of components can be accommodated. Further they are so shaped that no portion of the surface of the component 14 is subjected to compressive forces from the jaws. A supporting means or L-shaped member 15 in FIG. 2 is fastened to pivotal jaw 10 by means of screw 16. L-shaped member 15 is provided with an elongated slot to allow movement transverse to the pivotal jaws of the invention. By means of this transverse movement, the radius and shape of the bend placed in the wire can be varied. The edge of the leg of the L-shaped member running parallel to the sides of the tool contains slots 15*a* to insure that the wire connector passing out of the electrical component is engaged and supported by the L-shaped member at this predetermined location. In this manner the electrical component is loosely positioned within the plier jaws without being crushed, while the wire connector is rigidly held by the plier jaws and supported by the L-shaped member. This is illustrated by FIG. 4 and FIG. 5. Another pivoted member 17 is designed to apply a force to the connective wire and thus shape it with the particular bend intended.

In operation, as shown in FIG. 3 and FIG. 5, member 17 pivots about screw 18 to fall within member 15. In so pivoting, it forces the wire connector resting upon slot 15*a* of member 15 to be bent in accordance with the contours of the three interlocking members. Since the wire connector is gripped securely along region 19 and the component 14 is merely positioned freely within the jaws, the wire is shaped by forces acting exclusively upon the wire without any bending stress being placed upon the electrical component itself.

When pivotal member 17 is withdrawn from the side of pivotal jaws 10 and 11 and member 15, the component can be removed and its lead wires are removed and permanently shaped in the desired form. In this form the lead wires can be inserted into openings or eyelets 20 in an electrical circuit board 21 as illustrated in FIG. 7.

Because electrical components vary in size and shape, it has been found necessary to allow for some adjustability in the indentations 12 and 13 designed to receive the component. Thus adjustment screw 22 illustrated in FIG. 6, has been placed in one of the plier jaws. As the size of the components vary, it may be turned to open or close the mouth of the jaws; thereby accommodating the various elements. As long as indentations 12 and 13 clear the body of the component, screw 22 can be adjusted to select the degree of engagement of portions 19 of the jaw with the lead wires.

While the invention has been described in somewhat specific features, it is to be understood that the invention is not limited to the specific features shown, and may be utilized in any form set forth as falling within the appended claims.

What is claimed is:

1. A tool for shaping the connective element of an electrical component having a solid body with at least one connective element extending therefrom comprising:
plier-like jaws having indentations on the inner facing surfaces thereof, said indentations being in a mating relationship in the closed position of said jaws, said jaws being adapted to rigidly hold a portion of the length of the connective element between said facing surfaces while simultaneously receiving the component within said indentations without engaging the surface thereof,
means disposed adjacent to said jaws for supporting another portion of the length of the connective element, and
means for applying a force to the connective element at a point between said jaws and said supporting means, whereby the application of force enables the connective element to be shaped into a predetermined form.

2. A tool for shaping the connective element of an electrical component having a body with at least one connective element extending therefrom comprising:
plier-like jaws having indentations on the inner facing surfaces thereof, said indentations being in a mating relationship in the closed position of said jaws, said jaws being adapted to rigidly hold a portion of the length of the connective element between said facing surfaces while simultaneously receiving the component within said indentations without engaging the surface thereof, an adjustable stop member disposed on the inner facing surface of one of said jaws and adapted to engage the inner facing surface of the other of said jaws, said stop determining the closed position of said jaws to prevent the engagement of the surfaces of said indentations with said component,
means for supporting another portion of the length of the connective element, and
means for applying a force to said connective element at a point between said holding means and said supporting means, whereby said connective element is shaped to a predetermined form.

3. A tool for shaping the connective element of an electrical component having a body portion with one or more connective elements extending therefrom comprising:
means for rigidly holding a portion of the length of the connective element along a predetermined axis,
an L-shaped member having one leg thereof connected to said holding means, said L-shaped member having the other leg thereof spaced from said holding means and extending adjacent to the predetermined axis for supporting another portion of the length of the connective element,
means for applying a force to said connective element at a point between said holding means and the other leg of said L-shaped member, whereby said connective element is shaped to a predetermined form.

4. A tool for shaping the connective element of an electrical component having a body with at least one connective element extending therefrom comprising:
means for rigidly holding a portion of the length of the connective element along a predetermined axis,
an L-shaped member having one leg thereof connected to said holding means, said L-shaped member having the other leg thereof spaced from said holding means and extending adjacent to the predetermined axis for supporting another portion of the length of the connective element having a slot placed in said L-shaped member to support said connective element, and
means for applying a force to said connective element at a point between said holding means and the other leg of said L-shaped member whereby said connective element is shaped to a predetermined form.

5. A tool for shaping the wire connective element of an electrical component having a solid body with one or more connective elements extending therefrom comprising:
a pair of pivotal jaws indented at one point to receive the electrical component while holding the wire connective element in a secure rigid position,
an L-shaped member,
one leg of said member fastened to the exterior of one of said pivotal jaws,
the other leg of said member being located adjacent to the side of the pivotal jaws and notched to receive the connective element of the electrical component and to support it,
a lever member pivotally fastened to the tool,
said lever pivoting between the adjacent sides of said pivotal jaws and said other leg of said L-shaped member to shape said wire connective element by forcing said element between said L-shaped member and the side of said pivotal jaws.

6. The tool according to claim 4 in which the leg of said L-shaped member, connected to said holding means, has an elongated slot extending transversely with respect to said holding means, said elongated slot enabling said L-shaped member to be movable transversely along the outer surface of said holding means.

7. The tool according to claim 6 in which said force applying means comprises a lever pivotally fastened to the tool and pivoting between the holding means and the supporting means.

References Cited

UNITED STATES PATENTS

| | | | |
|---|---|---|---|
| 2,217,486 | 10/1940 | Larson | 72—384 |
| 3,146,804 | 9/1964 | Wallshein | 140—106 |
| 3,193,171 | 7/1965 | Johnson et al. | 72—386 |
| 3,212,368 | 10/1965 | Hutchinson et al. | 140—123 |

CHARLES W. LANHAM, *Primary Examiner.*

L. A. LARSON, *Assistant Examiner.*